United States Patent
Wang et al.

(10) Patent No.: US 11,969,895 B2
(45) Date of Patent: Apr. 30, 2024

(54) HIGHLY INTEGRATED HIGH-PERFORMANCE ROBOT JOINT UNIT

(71) Applicant: HangZhou YuShu TECHNOLOGY CO., LTD., Zhejiang (CN)

(72) Inventors: Xingxing Wang, Zhejiang (CN); Zhiyu Yang, Zhejiang (CN)

(73) Assignee: HANGZHOU YUSHU TECHNOLOGY CO., LTD., Zhejiang (CN)

(*) Notice: Subject to any disclaimer, the term of this patent is extended or adjusted under 35 U.S.C. 154(b) by 484 days.

(21) Appl. No.: 17/286,186

(22) PCT Filed: Sep. 17, 2019

(86) PCT No.: PCT/CN2019/106113
§ 371 (c)(1),
(2) Date: Apr. 16, 2021

(87) PCT Pub. No.: WO2020/125095
PCT Pub. Date: Jun. 25, 2020

(65) Prior Publication Data
US 2021/0354292 A1  Nov. 18, 2021

(30) Foreign Application Priority Data

Dec. 20, 2018 (CN) .......................... 201811561682.8

(51) Int. Cl.
*B25J 9/16* (2006.01)
*B25J 9/10* (2006.01)
(Continued)

(52) U.S. Cl.
CPC .............. *B25J 9/1633* (2013.01); *B25J 9/102* (2013.01); *B25J 13/088* (2013.01); *B25J 19/06* (2013.01); *F16D 7/025* (2013.01); *H02K 1/2791* (2022.01)

(58) Field of Classification Search
CPC ........ B25J 9/1633; B25J 9/102; B25J 13/088; B25J 19/06; B25J 9/126; B25J 17/00; B25J 17/02; F16D 7/025; H02K 1/2791
See application file for complete search history.

(56) References Cited

U.S. PATENT DOCUMENTS 10,144,464 B1  12/2018  Buerger et al.

FOREIGN PATENT DOCUMENTS

CN  201847094 U  *  6/2011
CN  106737825 A      5/2017
(Continued)

*Primary Examiner* — Mary Cheung
(74) *Attorney, Agent, or Firm* — Muncy, Geissler, Olds & Lowe, P.C.

(57) ABSTRACT

The present application discloses a highly integrated high-performance robot joint unit, belonging to the technical field of robot apparatuses. When a reducer of an existing robot joint is in overload working state, it causes joint parts such as a reducer gear to be damaged, and a meshing tooth surface of each tooth of the reducer is unevenly worn. In the present application, when a torque transmitted to a gear ring by an output end of a motor rotor or a reducer assembly is greater than a friction torque between the gear ring and a motor base, the gear ring of the reducer assembly is driven by the output end of the motor rotor or the reducer assembly to overcome the friction torque generated under the action of a friction force generator, such that the gear ring and the motor base rotate relatively, thus realizing the frictional sliding between the reducer assembly and the motor base, limiting the torque borne by the reducer assembly, and preventing the reducer from being damaged due to the large torque from the motor end or the output end of the joint unit.

16 Claims, 4 Drawing Sheets

(51) Int. Cl.
*B25J 13/08* (2006.01)
*B25J 19/06* (2006.01)
*F16D 7/02* (2006.01)
*H02K 1/2791* (2022.01)

(56) References Cited

FOREIGN PATENT DOCUMENTS

| | | | | |
|---|---|---|---|---|
| CN | 107685341 A | | 2/2018 | |
| CN | 108006172 A | * | 5/2018 | |
| CN | 108515536 A | | 9/2018 | |
| CN | 108638118 A | | 10/2018 | |
| CN | 109591045 A | | 4/2019 | |
| CN | 110072676 A | * | 7/2019 | ............ B25J 19/06 |
| CN | 209364654 U | | 9/2019 | |
| JP | 2009291874 A | * | 12/2009 | |

* cited by examiner

HIGHLY INTEGRATED HIGH-PERFORMANCE ROBOT JOINT UNIT

TECHNICAL FIELD

The present application relates to a highly integrated high-performance robot joint unit, belonging to the technical field of robot apparatuses.

BACKGROUND

A joint power unit of a high-performance robot is the core component of the robot, and its performance directly influences the movement performance of the robot. For ideal robot joint power, it needs to have the features of high output torque/weight density, simple and compact structure, low production cost and so on.

For joint power units applied to such occasions as high-performance legged robots, manipulators or exoskeletons, due to the complex terrain on the ground or the impact interference from the outside, when the driving torque of the robot joint motor is greater than the maximum torque bearable for the joint reducer or the external maximum torque transmitted to the reducer by the output shaft of the reducer is greater than the maximum torque bearable for the reducer, the reducer of the robot joint is in an overload working state, resulting that the joint parts such as the gear of the reducer are damaged.

Moreover, since the robot joint works in a reciprocating mode for a long time under these working conditions, it needs to bear the impact load from the ground or external environment. Therefore, the meshing tooth surface of each tooth of the reducer is seriously unevenly worn.

Further, in order to meet the requirements of high output torque/weight density, simple and compact structure, low manufacturing cost and so on, a common robot joint power unit often adopts the design that the joint unit is not provided with a central shaft hole, such that it is unable to realize hollow wiring, the cable is directly hung outside the robot joint and it influences the safety and attractiveness of the robot structure.

SUMMARY

In view of the defects of the prior art, one purpose of the present application is to provide a highly integrated high-performance robot joint unit which can realize frictional sliding and torque limitation, is suitable for a variety of complex working conditions, and will not cause damage to joint parts when the joint bears impact load.

Another purpose of the present application is to provide a highly integrated high-performance robot joint unit which adopts the feature that a shaft hole is provided in the joint unit, can realize hollow wiring or connection of other parts in a penetrating manner, and has an attractive and compact structure.

In order to realize the above purposes, the present application adopts the following technical solution:

A highly integrated high-performance robot joint unit includes a motor assembly driving a joint to move and a reducer assembly; the motor assembly includes a motor rotor for outputting a torque and a motor base; the reducer assembly is provided with a gear ring, and the gear ring is in conflicting connection with the motor base under the action of a friction force generator;

when a torque transmitted to the gear ring by an output end of the motor rotor or the reducer assembly is smaller than a friction torque between the gear ring and the motor base, the gear ring of the reducer assembly is fixed on the motor base under the action of the friction torque generated under the action of the friction force generator, and the motor rotor drives the output end of the reducer assembly to rotate;

when the torque transmitted to the gear ring by the output end of the motor rotor or the reducer assembly is greater than the friction torque between the gear ring and the motor base, the gear ring of the reducer assembly is driven by the output end of the motor rotor or the reducer assembly to overcome the friction torque generated under the action of the friction force generator, such that the gear ring and the motor base rotate relatively, thus realizing the frictional sliding between the reducer assembly and the motor base, limiting the torque borne by the reducer assembly, and preventing the reducer from being damaged due to the large torque from the motor end or the output end of the joint unit, such that the present application is suitable for various complex working conditions and the joint parts are not damaged when the joint bears the impact load.

As an exemplary technical measure, the motor rotor is connected in an inner cavity of the motor base in a penetrating manner, an outer cover of the motor base is provided with a front end cover, and the friction force generator is assembled in an accommodating cavity formed by the motor base and the front end cover. The structure is compact and reliable and the production is facilitated.

As an exemplary technical measure, the front end cover is fixedly connected with the motor base and squeezes the friction force generator assembled in the inner cavity, and the friction force generator pushes the gear ring such that the gear ring is in squeezing and frictional fit with and the motor base; and the gear ring has an annular friction surface. The annular friction surface increases the friction area between the gear ring and the friction force generator or the motor base, reduces the wear and increases the heat dissipation performance.

As an exemplary technical measure, the gear ring is provided with an annular friction disc, and the annular friction disc is in frictional connection with the motor base or the gear ring; the friction disc is made of a wear-resistant material. By adopting the independent friction disc, the maintenance and replacement in the future are facilitated.

As an exemplary technical measure, an output encoder with a hollow structure is assembled between a planetary gear carrier and the motor base; a motor encoder is assembled between the motor rotor and the motor base; the motor encoder and the output encoder include but are not limited to magnetic encoder, inductive encoder, capacitive encoder, resolver and photoelectric encoder; the output encoder is mainly used to realize real-time angle detection of the output end of the reducer assembly when the gear ring frictionally slides.

In the present application, by adding an encoder between the planetary gear carrier and the motor base, the present application has the ability of angle detection of the output shaft end under the condition of ensuring the compact structure of the present application; compared with the joint unit only with an encoder at the motor end, the control performance is greatly improved.

As an exemplary technical measure, the friction force generator is a passive elastic element, including but not limited to disc spring, wave spring and coil spring. The structure is simple and reliable, and the manufacturing cost is low.

As an exemplary technical measure, the friction force generator is an active control unit and is capable of generating a squeezing force, such that the gear ring and the motor base are capable of being in close squeezing and frictional fit with each other; the active control unit includes but is not limited to electromagnet and electrostrictive material; after the active control unit is adopted, the friction force generator is capable of dynamically adjusting the maximum friction torque between the gear ring and the motor base in real time according to the actual needs, such that the joint unit is applicable to various working conditions.

As an exemplary technical measure,
the motor assembly further includes a motor stator, a winding and a motor rear end cover;
the reducer assembly further includes a sun gear, a planetary gear, a gear ring, a planetary gear carrier, an output flange and an output bearing end cover;
the friction disc, the friction force generator and the front end cover form a torque limiting assembly;
the motor base, the friction disc, the gear ring, the friction force generator and the front end cover jointly form a friction torque limiting mechanism.

The present application has the ability of torque limitation, and realizes the torque limitation from the motor to the output flange and from the output flange to the motor end. The reliability of the robot joint unit is greatly improved. Moreover, the sliding of the gear ring relative to the motor base caused by the occasional torque limitation facilitates balancing the wear of the whole reducer and greatly increases the service life of the joint unit.

As an exemplary technical measure, a shaft of the motor rotor has a hollow structure; the shaft of the motor rotor is a structure integrated with or split from but fixedly connected with the motor rotor; the motor encoder has a hollow structure; the sun gear also has a hollow structure, and the sun gear is fixedly connected with the motor rotor. The joint unit of the present application is provided with a shaft hole, such that the present application realizes a hollow structure on the premise of compact structure and high torque/weight density, thus facilitating the hollow wiring or connection of other parts in a penetrating manner in the actual application of the joint unit. At the same time, the cable is assembled inside the joint unit, such that the joint unit is more structurally safe and attractive.

As an exemplary technical measure,
the planetary gear is a dual gear and is capable of realizing a higher reduction ratio than a conventional planetary gear on the premise of only slightly increasing the weight and volume of the reducer;
the planetary gear carrier and the output flange are fixedly connected, and the two parts have a shaft shoulder and clamp the output bearing on the output flange while being fixedly connected with each other, such that no additional parts are needed to fix the bearing axially, the number of parts is reduced, the weight and volume of the joint unit are reduced, and the cost is reduced.

As an exemplary technical measure, the output bearing is a cross roller bearing, which improves the ability of the output shaft of the joint unit in bearing an axial force; at least two of a rear end cover bearing, a motor base bearing and a center bearing are provided; the motor assembly is a permanent magnet motor with an outer rotor, such that the joint structure is more compact, the manufacturing process of the motor is simpler and more convenient, and the cost is low.

Compared with the prior art, the present application has the following beneficial effects:

In the present application, when the torque transmitted to the gear ring by the output end of the motor rotor or the reducer assembly is greater than the friction torque between the gear ring and the motor base, the gear ring of the reducer assembly is driven by the output end of the motor rotor or the reducer assembly to overcome the friction torque generated under the action of the friction force generator, such that the gear ring and the motor base rotate relatively, thus realizing the frictional sliding between the reducer assembly and the motor base, limiting the torque borne by the reducer assembly, and preventing the reducer from being damaged due to the large torque from the motor end or the output end of the joint unit, such that the present application is applicable to various complex working conditions and the joint parts are not damaged when the joint bears the impact load.

Further, the joint unit provided by the present application is provided with a shaft hole, such that the present application still realizes a hollow structure on the premise of compact structure and high torque/weight density. The hollow wiring or connection of other parts in a penetrating manner is facilitated in the actual application of the joint unit. At the same time, the cable is assembled inside the joint unit and the external cable is omitted, thus improving the integration of the joint unit, avoiding the possible damage to the cable caused by the external environment, and making the structure of the joint unit to be more safe and attractive.

DESCRIPTION OF REFERENCE SIGNS

1—motor assembly; 2—motor encoder; 3—reducer assembly; 4—torque limiting assembly; 11—motor stator and winding; 12—motor rotor; 13—motor base; 14—motor rear end cover; 15—motor rear end cover bearing; 16—motor base bearing; 31—sun gear; 32—planetary gear; 33—gear ring; 34—planetary gear carrier; 35—output flange; 36—output bearing 37—output bearing end cover; 38—center bearing; 39—output encoder; 41—friction disc; 42—friction force generator; 43—front cover.

DETAILED DESCRIPTION

In order to make the purposes, technical solutions and advantages of the present application more clear, the present application will be further described in detail in combination with the embodiments with reference to the drawings. It should be understood that the specific embodiments described herein are only used for describing instead of limiting the present application.

On the contrary, the present application covers any replacement, modification, equivalent method and solution defined by the claims in the essence and scope of the present application. Further, in order to make the public have a better understanding of the present application, some specific details are described in detail in the following detailed description of the present application. Those skilled in the art can fully understand the present application without the description of these details.

Figure 1:
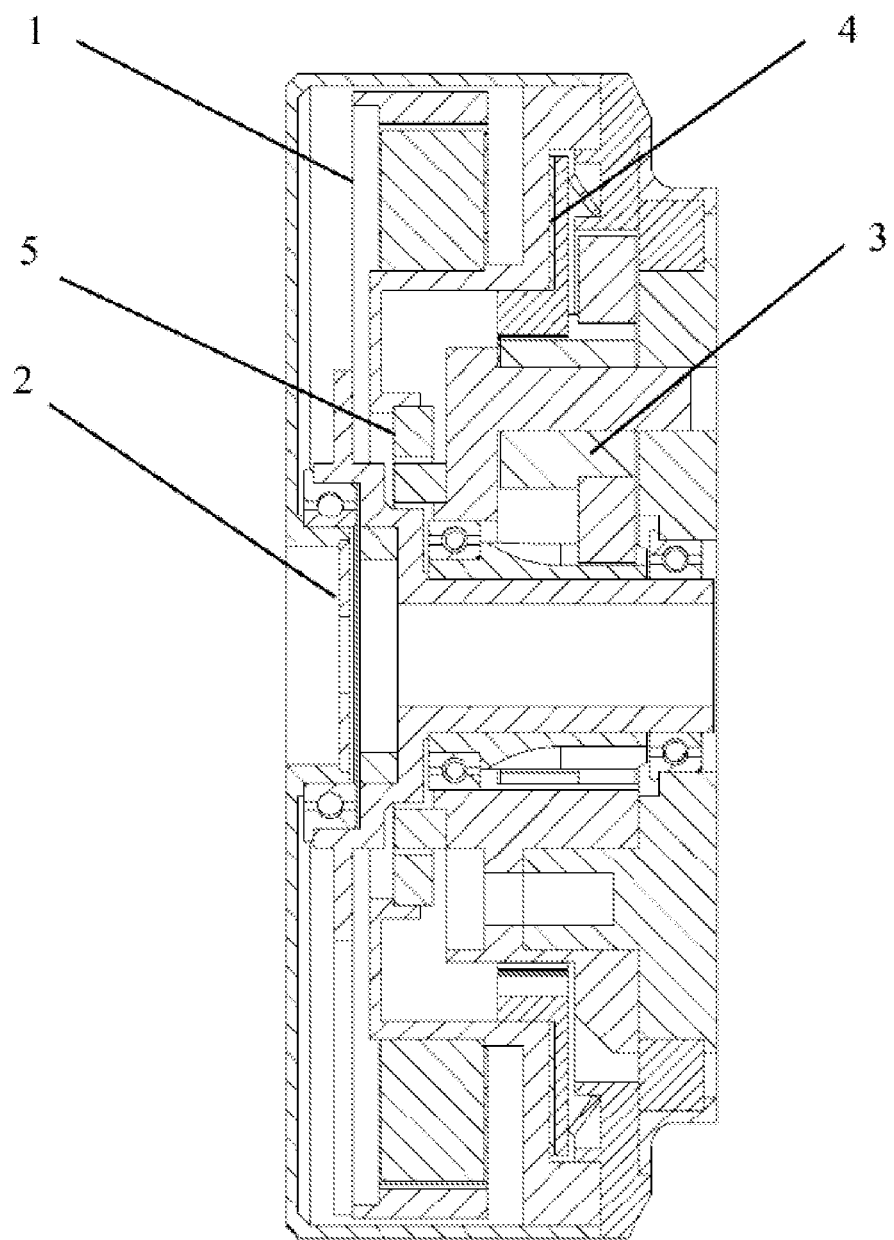
FIG. 1 illustrates an overall sectional view of the present application.
Figure 2:
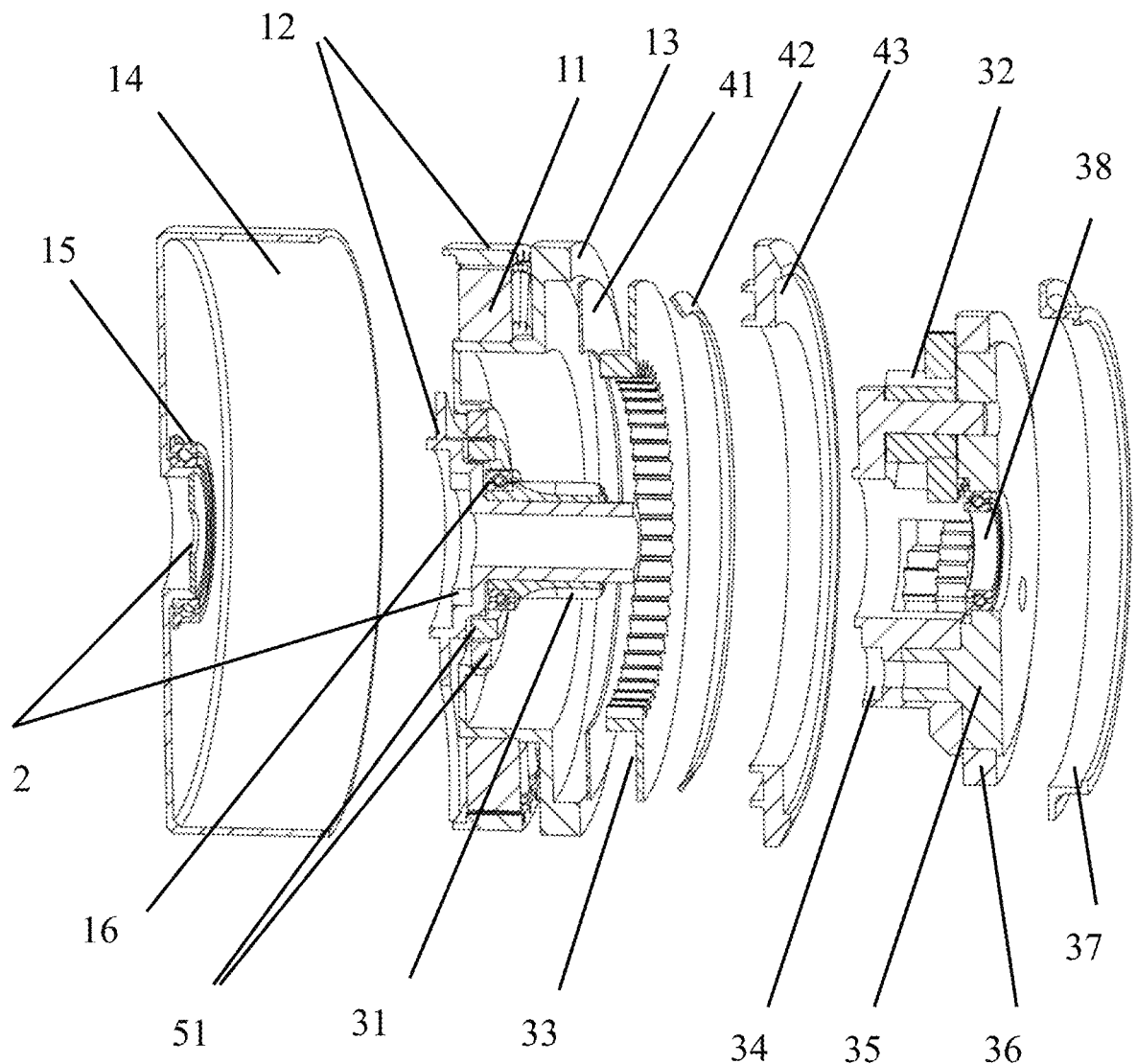
FIG. 2 illustrates an exploded view of the present application.
Figure 3:
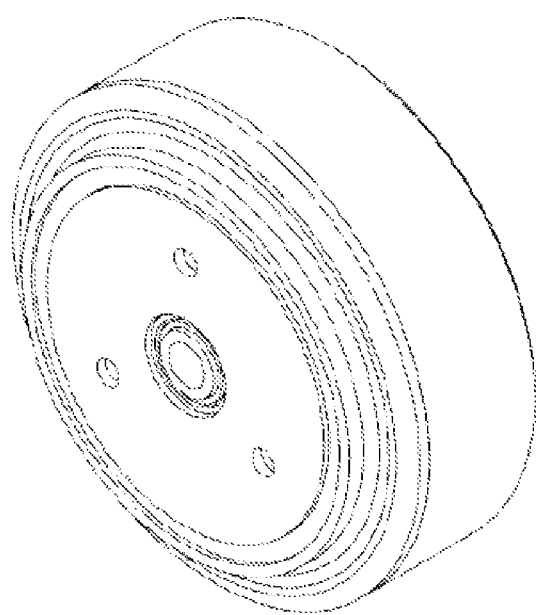
FIG. 3 illustrates an overall outside view of the present application.
Figure 4:
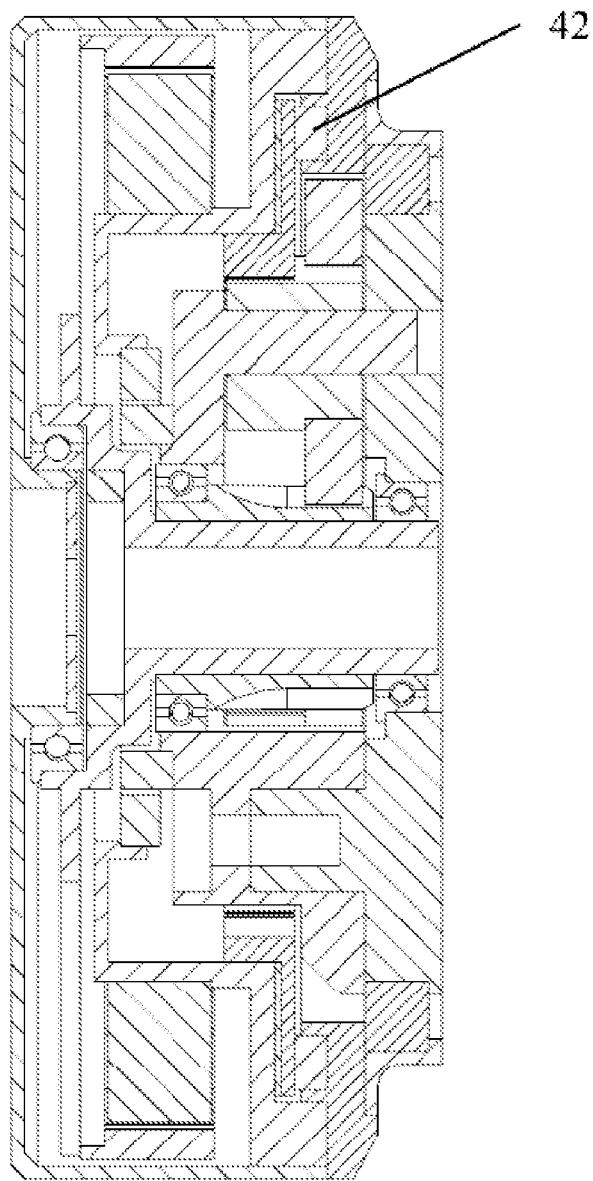
FIG. 4 illustrates an overall sectional view when a friction force generator in the present application is an active control unit.

Referring to FIGS. 1-4, a highly integrated high-performance robot joint unit includes a motor assembly 1 driving a joint to move and a reducer assembly 3; the motor assembly 1 includes a motor rotor 12 for outputting a torque and a motor base 13.

The reducer assembly 3 is provided with a gear ring 33, and the gear ring 33 is in conflicting connection with the motor base 13 under the action of a friction force generator 42.

When a torque transmitted to the gear ring 33 by an output end of the motor rotor 12 or the reducer assembly 3 is smaller than a friction torque between the gear ring 33 and the motor base 13, the gear ring 33 of the reducer assembly 3 is fixed on the motor base 13 under the action of the friction torque generated under the action of the friction force generator 42, and the motor rotor 12 drives the output end of the reducer assembly 3 to rotate.

When the torque transmitted to the gear ring 33 by the output end of the motor rotor 12 or the reducer assembly 3 is greater than the friction torque between the gear ring 33 and the motor base 13, the gear ring 33 of the reducer assembly 3 is driven by the output end of the motor rotor 12 or the reducer assembly 3 to overcome the friction torque generated under the action of the friction force generator 42, such that the gear ring 33 and the motor base 13 rotate relatively, thus preventing the reducer from being damaged due to the large torque from the motor end or the output end of the joint unit.

Embodiment of friction disc 41 additionally provided in the present application:

the gear ring 33 is provided with an annular friction disc 41, and the annular friction disc 41 is in frictional connection with the motor base 13 or the gear ring 33; the friction disc 41 is made of a wear-resistant material. By adopting the independent friction disc 41, the maintenance and replacement in the future are facilitated.

Embodiment of specific structure of the present application:

the motor assembly 1 further includes a motor stator, a winding 11 and a motor rear end cover 14; the reducer assembly 3 further includes a sun gear 31, a planetary gear 32, a gear ring 33, a planetary gear carrier 34, an output flange 35 and an output bearing end cover 37; the friction disc 41, the friction force generator 42 and the front end cover 43 form a torque limiting assembly 4; the motor base 13, the friction disc 41, the gear ring 33, the friction force generator 42 and the front end cover 43 jointly form a friction torque limiting mechanism.

Embodiment of assembling of friction force generator 42 in the present application:

the motor rotor 12 is connected in an inner cavity of the motor base 13 in a penetrating manner, an outer cover of the motor base 13 is provided with a front end cover 43, and the friction force generator 42 is assembled in an accommodating cavity formed by the motor base 13 and the front end cover 43. The structure is compact and reliable.

The front end cover 43 is fixedly connected with the motor base 13 and squeezes the friction force generator 42 assembled in the inner cavity, and the friction force generator 42 pushes the gear ring 33 such that the gear ring 33 is in squeezing and frictional fit with and the motor base 13; and the gear ring 33 has an annular friction surface. The annular friction surface increases the friction area between the gear ring 33 and the friction force generator 42 or the motor base 13, reduces the wear and increases the heat dissipation performance.

Embodiment of encoder additionally provided in the present application:

an output encoder 39 with a hollow structure is assembled between a planetary gear carrier 34 and the motor base 13; a motor encoder 2 is assembled between the motor rotor 12 and the motor base 13; the motor encoder 2 and the output encoder 39 include but are not limited to magnetic encoder, inductive encoder, capacitive encoder, resolver and photoelectric encoder; the output encoder 39 is mainly used to realize real-time angle detection of the output end of the reducer assembly 3 when the gear ring 33 frictionally slides.

One embodiment of friction force generator 42 in the present application:

the friction force generator 42 is a passive elastic element, including but not limited to disc spring, wave spring and coil spring. The structure is simple and reliable.

Another embodiment of friction force generator 42 in the present application:

the friction force generator 42 is an active control unit and is capable of generating a squeezing force, such that the gear ring 33 and the motor base 13 are capable of being in close squeezing and frictional fit with each other; the active control unit includes but is not limited to electromagnet and electrostrictive material; after the active control unit is adopted, the friction force generator 42 is capable of dynamically adjusting the maximum friction torque between the gear ring 33 and the motor base 13 in real time according to the actual needs, such that the joint unit is applicable to various working conditions.

One embodiment of hollow wiring in the present application:

a shaft of the motor rotor 12 has a hollow structure; the shaft of the motor rotor 12 is a structure integrated with or split from but fixedly connected with the motor rotor 12; the motor encoder 2 has a hollow structure; the sun gear 31 also has a hollow structure, and the sun gear 31 is fixedly connected with the motor rotor 12. The joint unit realizes a hollow structure on the premise of compact structure and high torque/weight density, and facilitates the hollow wiring or connection of other parts in a penetrating manner in the actual application of the joint unit.

One embodiment of planetary gear 32 in the present application:

the planetary gear 32 is a dual gear and is capable of realizing a higher reduction ratio than a conventional planetary gear 32 on the premise of only slightly increasing the weight and volume of the reducer;

the planetary gear carrier 34 and the output flange 35 are fixedly connected, and the two parts have a shaft shoulder and clamp the output bearing 36 on the output flange 35 while being fixedly connected with each other, such that no additional parts are needed to fix the bearing axially, the number of parts is reduced, the weight and volume of the joint unit are reduced, and the cost is reduced.

Embodiment of bearing arrangement in the present application:

the output bearing 36 is a cross roller bearing, thus improving the axial force bearing ability of the output shaft of the joint unit; at least two of a rear end cover bearing 15, a motor base bearing 16 and a center bearing 38 are provided; the motor assembly 1 is a permanent magnet motor with an outer rotor, such that the joint structure is more compact, the manufacturing process of the motor is simpler and more convenient, and the cost is low.

What are described above are just exemplary embodiments of the present application, which are not used to limit the present application. Any modifications, equivalent replacements, improvements and the like made within the spirit and principle of the present application shall be included in the scope of protection of the present application.

The invention claimed is:

1. A highly integrated high-performance robot joint unit, comprising a motor assembly (1) driving a joint to move and a reducer assembly (3), wherein the motor assembly (1) comprises a motor rotor (12) for outputting a torque and a motor base (13);

the reducer assembly (3) is provided with a gear ring (33), and the gear ring (33) is in abutting connection with the motor base (13) under the action of a friction force generator (42);

when a torque transmitted to the gear ring (33) by an output end of the motor rotor (12) or the reducer assembly (3) is smaller than a friction torque between the gear ring (33) and the motor base (13), the gear ring (33) of the reducer assembly (3) is fixed on the motor base (13) under the action of the friction torque generated under the action of the friction force generator (42), and the motor rotor (12) drives the output end of the reducer assembly (3) to rotate;

when the torque transmitted to the gear ring (33) by the output end of the motor rotor (12) or the reducer assembly (3) is greater than the friction torque between the gear ring (33) and the motor base (13), the gear ring (33) of the reducer assembly (3) is driven by the output end of the motor rotor (12) or the reducer assembly (3) to overcome the friction torque generated under the action of the friction force generator (42), such that the gear ring (33) and the motor base (13) rotate relatively.

2. The highly integrated high-performance robot joint unit according to claim 1, wherein the motor rotor (12) is connected in an inner cavity of the motor base (13) in a penetrating manner, an outer cover of the motor base (13) is provided with a front end cover (43), and the friction force generator (42) is assembled in an accommodating cavity formed by the motor base (13) and the front end cover (43).

3. The highly integrated high-performance robot joint unit according to claim 2, wherein the front end cover (43) is fixedly connected with the motor base (13) and squeezes the friction force generator (42) assembled in the inner cavity, and the friction force generator (42) pushes the gear ring (33) such that the gear ring (33) is in squeezing and frictional fit with and the motor base (13); and the gear ring (33) has an annular friction surface.

4. The highly integrated high-performance robot joint unit according to claim 2, wherein the friction force generator (42) is an active control unit and is capable of generating a squeezing force, such that the gear ring (33) and the motor base (13) are capable of being in close squeezing and frictional fit with each other; the active control unit includes but is not limited to electromagnet and electrostrictive material;

after the active control unit is adopted, the friction force generator (42) is capable of dynamically adjusting the maximum friction torque between the gear ring (33) and the motor base (13) in real time according to the actual needs.

5. The highly integrated high-performance robot joint unit according to claim 4, wherein a shaft of the motor rotor (12) has a hollow structure; the shaft of the motor rotor (12) is a structure integrated with or split from but fixedly connected with the motor rotor (12); the motor encoder (2) has a hollow structure; the sun gear (31) also has a hollow structure, and the sun gear (31) is fixedly connected with the motor rotor (12).

6. The highly integrated high-performance robot joint unit according to claim 3, wherein the gear ring (33) is provided with an annular friction disc (41), and the annular friction disc (41) is in frictional connection with the motor base (13) or the gear ring (33); the friction disc (41) is made of a wear-resistant material.

7. The highly integrated high-performance robot joint unit according to claim 3, wherein the friction force generator (42) is an active control unit and is capable of generating a squeezing force, such that the gear ring (33) and the motor base (13) are capable of being in close squeezing and frictional fit with each other; the active control unit includes but is not limited to electromagnet and electrostrictive material;

after the active control unit is adopted, the friction force generator (42) is capable of dynamically adjusting the maximum friction torque between the gear ring (33) and the motor base (13) in real time according to the actual needs.

8. The highly integrated high-performance robot joint unit according to claim 7, wherein the planetary gear (32) is a dual gear and is capable of realizing a higher reduction ratio than a conventional planetary gear (32) on the premise of only slightly increasing the weight and volume of the reducer;

the planetary gear carrier (34) and the output flange (35) are fixedly connected, and the two parts have a shaft shoulder and clamp an output bearing (36) on the output flange (35) while being fixedly connected with each other.

9. The highly integrated high-performance robot joint unit according to claim 6, wherein an output encoder (39) with a hollow structure is assembled between a planetary gear carrier (34) and the motor base (13); a motor encoder (2) is assembled between the motor rotor (12) and the motor base (13); the motor encoder (2) and the output encoder (39) include but are not limited to magnetic encoder, inductive encoder, capacitive encoder, resolver and photoelectric encoder; the output encoder (39) is mainly used to realize real-time angle detection of the output end of the reducer assembly (3) when the gear ring (33) frictionally slides.

10. The highly integrated high-performance robot joint unit according to claim 6, wherein the friction force generator (42) is an active control unit and is capable of generating a squeezing force, such that the gear ring (33) and the motor base (13) are capable of being in close squeezing and frictional fit with each other; the active control unit includes but is not limited to electromagnet and electrostrictive material;

after the active control unit is adopted, the friction force generator (42) is capable of dynamically adjusting the maximum friction torque between the gear ring (33) and the motor base (13) in real time according to the actual needs.

11. The highly integrated high-performance robot joint unit according to claim 10, wherein an output bearing (36)

is a cross roller bearing; at least two of a rear end cover bearing (15), a motor base bearing (16) and a center bearing (38) are provided; the motor assembly (1) is a permanent magnet motor with an outer rotor.

12. The highly integrated high-performance robot joint unit according to claim 9, wherein the friction force generator (42) is a passive elastic element, including but not limited to disc spring, wave spring and coil spring.

13. The highly integrated high-performance robot joint unit according to claim 9, wherein the friction force generator (42) is an active control unit and is capable of generating a squeezing force, such that the gear ring (33) and the motor base (13) are capable of being in close squeezing and frictional fit with each other; the active control unit includes but is not limited to electromagnet and electrostrictive material;

after the active control unit is adopted, the friction force generator (42) is capable of dynamically adjusting the maximum friction torque between the gear ring (33) and the motor base (13) in real time according to the actual needs.

14. The highly integrated high-performance robot joint unit according to claim 12, wherein the friction force generator (42) is an active control unit and is capable of generating a squeezing force, such that the gear ring (33) and the motor base (13) are capable of being in close squeezing and frictional fit with each other; the active control unit includes but is not limited to electromagnet and electrostrictive material;

after the active control unit is adopted, the friction force generator (42) is capable of dynamically adjusting the maximum friction torque between the gear ring (33) and the motor base (13) in real time according to the actual needs.

15. The highly integrated high-performance robot joint unit according to claim 12, wherein the motor assembly (1) further comprises a motor stator, a winding (11) and a motor rear end cover (14);

the reducer assembly (3) further comprises a sun gear (31), a planetary gear (32), the gear ring (33), the planetary gear carrier (34), an output flange (35) and an output bearing end cover (37);

the friction disc (41), the friction force generator (42) and the front end cover (43) form a torque limiting assembly (4);

the motor base (13), the friction disc (41), the gear ring (33), the friction force generator (42) and the front end cover (43) jointly form a friction torque limiting mechanism.

16. The highly integrated high-performance robot joint unit according claim 1, wherein the friction force generator (42) is an active control unit and is capable of generating a squeezing force, such that the gear ring (33) and the motor base (13) are capable of being in close squeezing and frictional fit with each other; the active control unit includes but is not limited to electromagnet and electrostrictive material;

after the active control unit is adopted, the friction force generator (42) is capable of dynamically adjusting the maximum friction torque between the gear ring (33) and the motor base (13) in real time according to the actual needs.

* * * * *